July 6, 1926. 1,591,024
F. P. DODGE
OIL RECOVERY APPARATUS
Filed August 31, 1923  3 Sheets-Sheet 1
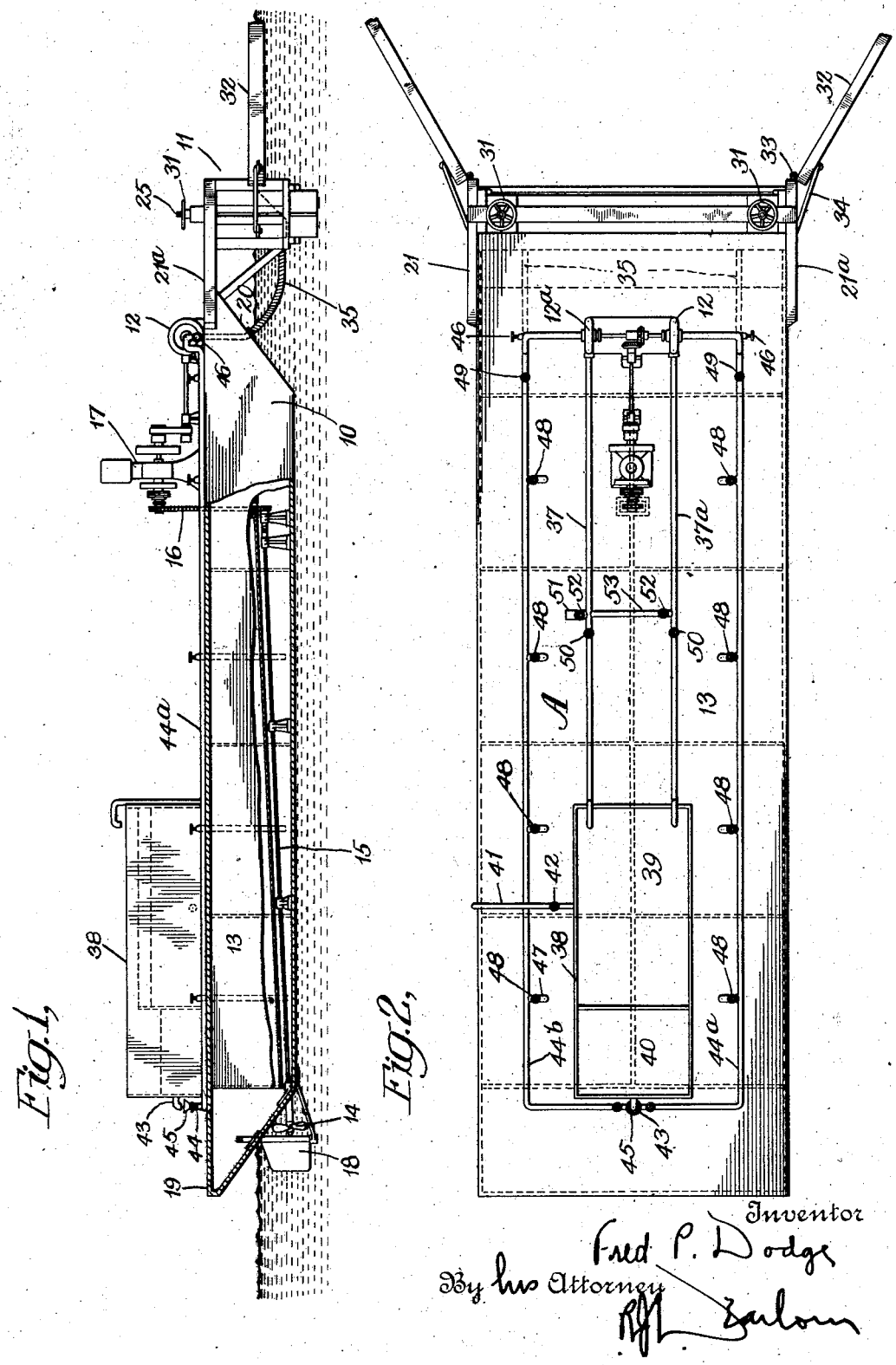

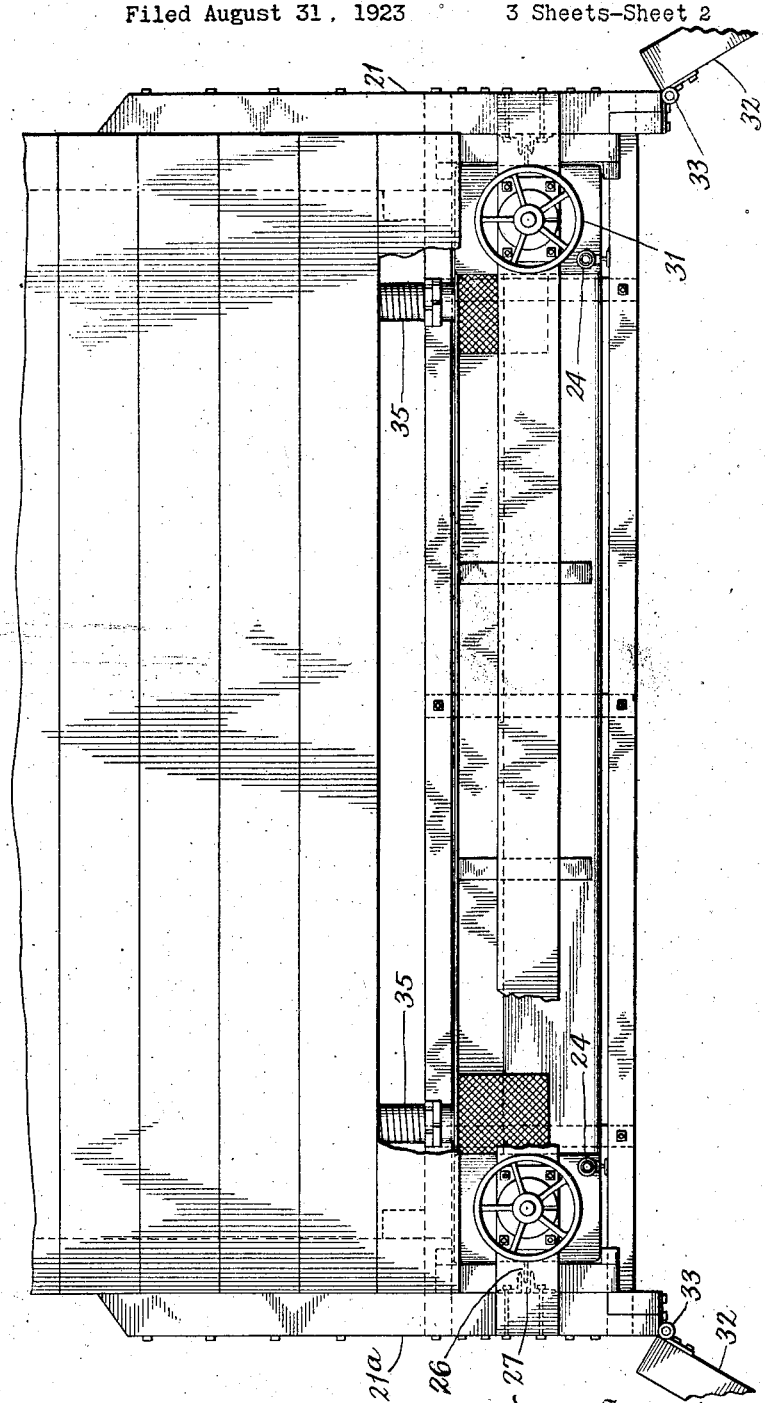

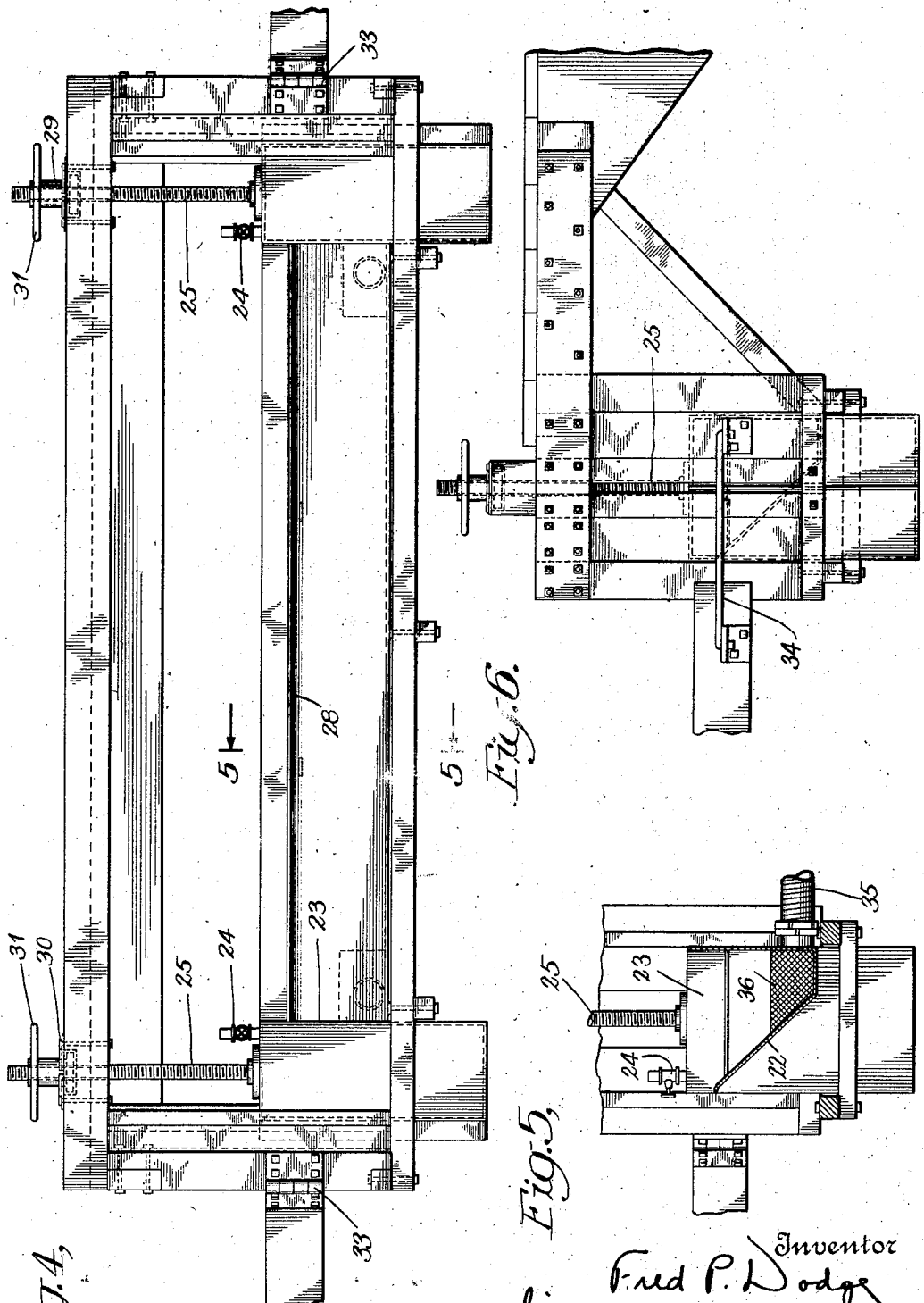

Patented July 6, 1926.

1,591,024

UNITED STATES PATENT OFFICE.

FRED P. DODGE, OF PORT ARTHUR, TEXAS, ASSIGNOR TO THE TEXAS COMPANY, OF NEW YORK, N. Y., A CORPORATION OF TEXAS.

OIL-RECOVERY APPARATUS.

Application filed August 31, 1923. Serial No. 660,280.

This invention relates to oil recovery apparatus and particularly to barges or vessels adapted for recovering oil from bayous, canals, harbors and other places where surface oil may be present.

The presence of oil in any considerable quantities on the surface of the water in harbors, rivers, canals, etc., is always objectionable and in many instances even dangerous because of the fire hazard. Furthermore, the carrying away of such oil represents a considerable financial loss in the course of a short time and its recovery effects a very appreciable saving.

The invention about to be described in detail is adapted to overcome the many obstacles presented when attempts are made to recover oil from the surface of the water in such places as harbors and rivers, and presents an efficient and effective means for recovering floating oil in commercial quantities at a minimum cost.

From the foregoing it will readily be seen that one of the objects of the present invention is to provide a means for recovering oil from the surface of the water wherever it may be present in such places as bayous, harbors, rivers and canals.

Another object of the present invention is to provide a means for skimming the oil from the surface of the water with the removal of as little water as possible.

A further object is to provide means for storing the recovered oil aboard the barge.

A still further object is to provide a self propelled barge adapted for the recovery of floating oil from water surfaces.

Still another object of the invention is to provide means for removing oil from the skimming pan to the storage tanks.

Yet another object is to provide means cooperating with the barge for quieting or stilling the waters in the vicinity of the skimming pan so that the maximum quantity of oil can be recovered with a minimum of water.

A still further object is to provide a skimming pan which can be raised or lowered both horizontally and vertically as circumstances may require.

Other and incidental objects of the invention will appear as the description thereof proceeds.

In the drawings, the apparatus is shown for the purpose of illustration in the form of a barge. Like reference numerals refer to similar parts throughout the several figures of the drawings.

Figure 1 is a view in side elevation, partially in section, of an oil recovery barge embodying the present invention.

Figure 2 is a plan view of the same barge.

Figure 3 is an enlarged plan view, partially in section, of the forward end of the barge.

Figure 4 is a view in front elevation of the barge shown in Figures 1 and 2.

Figure 5 is a sectional view on the line 5—5 of Figure 4.

Figure 6 is a view in side elevation of a portion of the barge.

While it may be said that the apparatus comprises in general a barge 10, skimming device 11, pumping mechanism 12 and 12$^a$ which may be housed, if desired, and storage tanks 13, a more detailed description of the apparatus is necessary and is accordingly presented herewith.

The barge 10 may be of any convenient type but so that it can navigate extremely shallow waters such as are frequently found in bayous and the smaller rivers it may well be constructed to draw as little water as possible. The barge is provided with operating mechanism including a propeller 14 connected by means of a shaft 15 and a chain 16 to an engine 17 which is mounted on a deck 19. A rudder 18 is likewise provided and is operated from the deck 19 by means of suitable mechanism (not shown).

From the prow 20 of the barge 10 extends a suitable framework comprising horizontally disposed arms 21 and 21$^a$ to each of which are secured a number of downwardly projecting members adapted to support a skimming pan 22 and its accessories.

The skimming pan 22 is horizontally disposed in the framework supported by the arms 21 and 21$^a$ and upon each of its ends is connected a buoyant chamber or tank 23 which may be filled with air, water or other fluid through a valve 24 for the purpose of reducing the weight required to be handled by screws 25 by which the position of the pan 22 and buoyant chambers 23 is adjusted vertically. The pan 22 and buoyant chambers 23 are connected together and are slidably mounted in the framework attached to the forward end of the barge 10, the buoyant chambers 23 being constructed with lugs 26 adapted to engage in guide grooves 27 in the ends of the supporting framework which is secured to the arms 21 and 21ª. In operation, the skimming pan 22 is adjusted so that the edge 28 thereof is approximately flush with the surface of the water so as to permit the film of floating oil to flow into the pan without taking in any more water than can be avoided. The screws 25 are rotatably mounted on the tops of the buoyant tanks 23 and extend upwardly and through an internally threaded sleeve member 29 to which is secured a wheel 31 by means of which the buoyant tanks 23 and the attached pan 22 may be raised or lowered.

From each of the front corners of the barge 10 extends an adjustable beam 32 adapted to be partially immersed in the water. One end of each beam 32 is hingedly secured to the barge by means of a hinge 33. The two beams can be held in any desired position by means of the securing rods 34, the ends of which are suitably secured to the barge and to the beams. The function of the beams is to direct the oil towards the skimming pan 22 and to quiet the surface of the water in the vicinity of the pan so that a minimum of water will be taken in the pan. On the deck 19 of the barge 10 a pair of pumps 12 and 12ª are secured, the inlet line 35 of each of which extends to and is in open communication with the skimming pan 22. Each of the lines 35 is provided with a cut-off valve 46. The open ends of the inlet lines 35 may be protected by perforated strainers 36 by means of which solid matter which may enter the skimming tank is prevented from entering the inlet lines. The pumps 12 are operated by the engine 17. Fluid entering the skimming tank 22 is drawn up by the pumps 12 through the inlet lines 35 and then pumped through pipes 37 and 37ª to a separating tank 38 which is positioned on the after deck of the barge 10. The pipes 37 and 37ª are connected by a connecting pipe 53 which extends from a point in the pipe 37ª between a cut-off valve 50 and the pump 12 to the pipe 37 at a point between a cut-off valve 50 and the pump 12ª. The connecting pipe is provided with a valve 52. The pipe 37 is likewise connected to a draw off pipe 51 provided with a valve 52 by means of which oil can be pumped from the barge through a suitable hose connection which is easily secured to the draw off pipe 51.

The separating tank consists of one or more compartments, such as 39 and 40, through which the oil and water from the pumps is caused to flow and wherein at least a partial separation of the oil and water is effected. The first compartment 39 is provided with a valved water outlet pipe 41 through which excess water may be discharged over the side of the barge by merely opening a valve 42. The second compartment 40 in which the oil collects, is provided with a valved outlet 43 by which the oil is removed from the tank. The pipe 43 discharges into a pipe 44 having a swaged nipple 45 so that the operator can observe whether oil or water is flowing out of the pipe 43. Just below the nipple 45 the pipe 44 divides and one section thereof 44ª extends along one side of the barge, while the other section 44ᵇ extends along the opposite side.

The hold of the barge 10 is provided with a series of compartments 13 adapted to hold the recovered oil until such time as it can be conveniently pumped to tanks located on the shore. The pipe lines 44ª and 44ᵇ are provided with a number of branch lines 47, extending downwardly into the several compartments 13. Each of the branch lines 47 is provided with a valve 48. It will be seen that oil drawn from the separating tank can be passed into any one or all of the compartments by a simple manipulation of the valves 48. Likewise, when it is desired to pump the oil contained in the several compartments to tanks located on the shore, it is simply necessary to close the valves 46 so that no more oil will be sucked in from the skimming pan and then to close all of the valves in the several branch lines excepting the one regulating the passage of oil to or from the particular compartment from which it is desired to remove the oil. It is evident that when the valves 46 are closed and the valves 49 opened, the continued operation of the pump will draw off from any of the compartments which may be in open communication with the pipe 44ª or 44ᵇ. The course of the oil can be so directed that it will be pumped through the draw off pipe 51 and into the hose which leads to the storage tanks on the shore.

The foregoing describes a method and apparatus which have been found particularly well adapted for skimming oil from the surface of the water in harbors, rivers, etc., but it should be clearly understood that this invention is not limited to the exact construction shown and described. It is readily apparent that while the word "barge" is used in the description and in a majority of the claims to denote floating conveyances, the invention is not limited by the strict technical definition of the word "barge" as other floating conveyances are also well adapted for the purpose herein described. It will be seen that other variations can be made without in any sense departing from the spirit and scope of the present invention and no limitations are intended other than those imposed by the appended claims.

What I claim is—

1. Oil recovery apparatus comprising a vessel, means secured to the vessel for skimming floating oil from the surface of a body of water, means for conducting the recovered oil aboard the vessel, means for separating the oil from any water with which it may be mixed, a plurality of separate compartments for storing the oil, and means connecting the separating means and the several compartments for selectively delivering the oil from the separating means to any one or all of the storing compartments.

2. The combination with a barge, of a framework supported at one end thereof and having a vertically disposed guide groove in said frame-work, a skimming pan disposed in said frame-work, a buoyant chamber secured to said skimming pan, a lug on said buoyant chamber adapted to slide in the aforementioned guide groove for guiding the vertical movement of the skimming pan, and means attached to the buoyant chamber for raising and lowering the skimming pan.

3. The combination with a barge having a supporting frame-work at one end thereof and a vertically disposed guide groove in said frame-work, of a skimming pan disposed in said frame-work, a buoyant tank secured to said skimming pan, a lug on said buoyant tank adapted to slide in the aforementioned guide groove for guiding the vertical movement of the skimming pan, a valve in said buoyant tank for the introduction of fluid, and means attached to the buoyant chamber for raising and lowering the skimming pan.

4. The combination with a barge, of a frame-work supported at one end thereof, vertically disposed guide grooves in said frame-work, a skimming pan disposed in said frame-work, a buoyant chamber secured to each end of said pan, lugs on each of said buoyant chambers adapted to slide in the aforementioned guide grooves, a valve in each of said buoyant chambers for the introduction of a counterbalancing fluid, and means attached to each of said buoyant chambers for raising and lowering either or both ends of said skimming pan.

In witness whereof I have hereunto set my hand this 24th day of August, 1923.

F. P. DODGE.